United States Patent [19]

Hlady

[11] 3,916,099

[45] Oct. 28, 1975

[54] TOUCH SENSITIVE POSITION ENCODER USING A LAYERED SHEET

[75] Inventor: Alvin M. Hlady, Ottawa, Canada

[73] Assignee: Canadian Patents and Development Limited, Ottawa, Canada

[22] Filed: June 21, 1974

[21] Appl. No.: 481,896

[30] Foreign Application Priority Data

July 19, 1973 Canada .............................. 176912

[52] U.S. Cl. .......................... 178/18; 340/347 AD

[51] Int. Cl.² ........................................ G08C 21/00

[58] Field of Search ........... 178/18, 19, 20; 310/9.1, 310/9.7, 9.8; 340/324 R, 365 R, 347 AD

[56] References Cited

UNITED STATES PATENTS

| | | | |
|---|---|---|---|
| 3,653,031 | 3/1972 | Hlady et al. | 340/347 AD |
| 3,673,327 | 6/1972 | Johnson et al. | 178/18 |
| 3,808,364 | 4/1974 | Veith | 178/19 |

*Primary Examiner*—Thomas A. Robinson
*Attorney, Agent, or Firm*—James R. Hughes

[57] ABSTRACT

A touch-sensitive position encoder which provides the position co-ordinates of the location at which a human finger or passive stylus makes contact with the surface of a transparent sheet or plate comprising an extensive transparent sheet, a first transducer positioned at a first position on an edge of said sheet, a second transducer positioned at a second position on an edge of said sheet, a pulsed source of energy connected to said transducers for generating surface waves on said sheet, receiver and timing means connected to said transducers for detecting and timing reflected energy pulses such that the position of the finger of stylus placed on the sheet and causing reflections will be determined in geometric co-ordinate terms, the said extensive transparent sheet being formed of a sheet of material capable of propagating elastic surface waves over its surface and a second sheet or layer bonded to or acoustically coupled to the surface of the first sheet away from that on which the elastic surface waves are to be propagated, said second sheet or layer being of a material capable of absorbing "bulk" waves entering therein. In the preferred embodiment, the extensive transparent sheet is formed of two sheets of glass with a plastic layer sandwiched between them.

5 Claims, 5 Drawing Figures

TOUCH SENSITIVE POSITION ENCODER USING A LAYERED SHEET

Figures 1, 2:
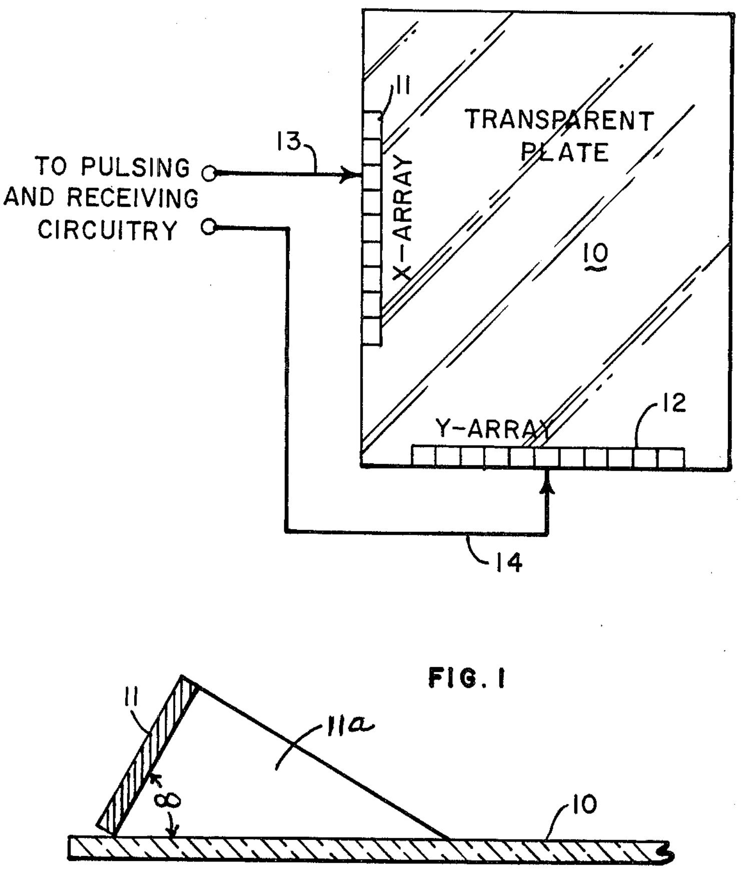

This invention relates to a touch-sensitive position encoder for computer input and more particularly to an improved sheet or tablet for such a device.

In U.S. Pat. No. 3,653,031 entitled Touch-Sensitive Position Encoder issued Mar. 28, 1972 to A. M. Hlady, W. C. Brown and J. W. Brahan, a position encoder for computer input is described in which transducers for the generation and reception of elastic surface waves (sometimes known as Rayleigh waves) are positioned at the edges of a sheet of transparent material, preferably glass. The transducers are connected to detecting and timing circuitry such that a passive stylus or a finger placed on the sheet will reflect the surface waves and have its position on the sheet determined in geometrical co-ordinate terms. This device has been quite successful and has found application in such areas as computer-aided teaching devices, airport control and surveillance apparatus, and stock inventory and purchasing systems.

In the devices made according to the above patent, a single unitary sheet of glass was used for the encoder plate or tablet. An upper size limit was found (approximately 10 inches × 10 inches in area) above which the device operated ineffectively due to poor signal-to-noise ratios. Two types of waves are engendered in the glass, a surface wave that follows closely along the surface and a "bulk" wave that travels in the inner volume of the glass sheet. These bulk waves travel faster than the surface waves and unwanted reflections result giving spurious responses. To get around this problem, the glass sheets have been provided with deep serrations along the edges that have dispersed the reflected bulk waves and reduced undesirable effects. This approach has generally worked well but results in a much more expensive encoder tablet as the serrations have to be precisely cut and the tablet with serrations is of course more difficult to handle and incorporate in the overall device.

It is an object of the present invention to provide a touch-sensitive position encoder table or plate that can be of large size and operate effectively with high signal-to-noise ratios.

It is another object of the invention to provide a tablet or plate that is simple, strong and easy to fabricate.

These and other objects of the invention are achieved by a touch-sensitive position encoder which provides the position co-ordinates of the location at which a human finger or passive stylus makes contact with the surface of a transparent sheet or plate comprising an extensive transparent sheet, a first transducer positioned at a first position on an edge of said sheet, a second transducer positioned at a second position on an edge of said sheet, a pulsed source of energy connected to said transducers for generating surface waves on said sheet, receiver and timing means connected to said transducers for detecting and timing reflected energy pulses such that the position of the finger of stylus placed on the sheet and causing reflections will be determined in geometric co-ordinate terms, the said extensive transparent sheet being formed of a sheet of material capable of propagating elastic surface waves over its surface and a second sheet or layer bonded to or acoustically coupled to the surface of the first sheet away from that on which the elastic surface waves are to be propagated, said second sheet or layer being of a material capable of absorbing "bulk" waves entering therein. In the preferred embodiment, the extensive transparent sheet is formed of two sheets of glass with a plastic layer sandwiched between them.

Figure 3:
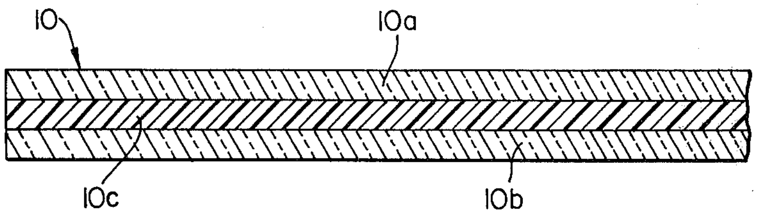
Figure 4:
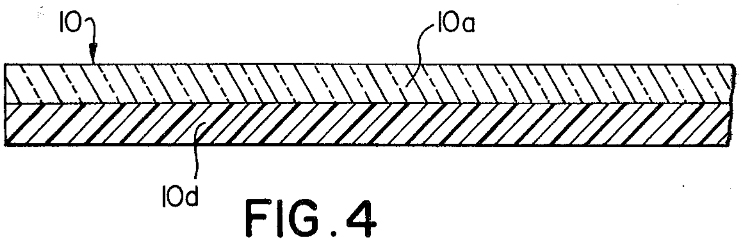
Figure 5:
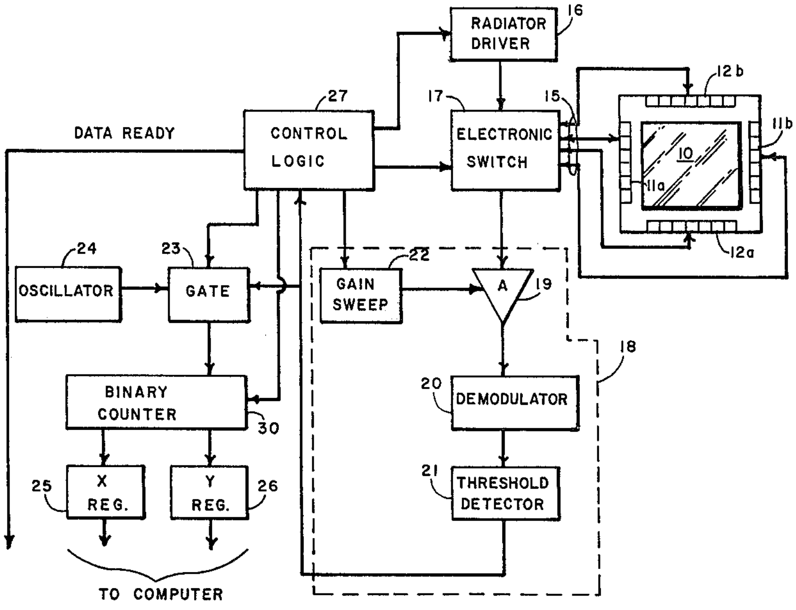

In drawings which illustrate embodiments of the invention,

FIG. 1 is a typical arrangement of a transparent plate or sheet with transducers attached, FIG. 2 is a cross-section of the prior art single layer sheet with transducer, FIG. 3 is a cross-section of a multiple layer plate, FIG. 4 is a cross-section of a glass sheet and attached absorbing layer, and FIG. 5 is an overall typical arrangement.

Referring to FIG. 1 a typical arrangement of an encoder is shown and consists of an extensive transparent plate or sheet 10. A series of transducers 11 and 12 for transmitting and receiving elastic surface waves are positioned along two edges of plate 10 to form X and Y-arrays. These are connected via leads 13 and 14 to pulsing, timing, and receiving circuitry. FIG. 2 shows a prior art form of plate 10 with a transducer 11 bonded to a prism 11*a* which in turn is bonded to plate 10 such that the plane of the transducer 11 lies at a predetermined angle $\alpha$ to the surface of the plate.

FIG. 3 is a cross-section of a plate construction that largely eliminates or reduces the problem of "bulk" wave reflections which result in low signal-to-noise operation. The plate 10 is made up of a generally thin first sheet of glass 10*a* and a second glass sheet 10*b* with an intermediate sheet or layer 10*c* of material that will absorb bulk waves and minimize the undesirable reflection of these. Many plastic materials are suitable for this intermediate layer with examples of these being vinyl and butyl plastics. It has been found that a suitable laminated plate structure can be formed from commercially available automobile windshield glass which comprises two sheets of glass with a thin plastic layer sandwiched in between.

The second sheet of glass is not always required although it lends strength and provides a symmetrical structure that allows elastic waves to be engendered on either surface. FIG. 4 is a cross-section of a plate 10 made up of a single sheet of glass 10*a* with a sheet or layer 10*d* of plastic material affixed or bonded to one surface.

In the above description, the extensive transparent sheet has been indicated as being preferably glass. Other transparent materials could be used, e.g. fused quartz sheets. This latter is much more expensive than glass and provides no great physical advantages. In most cases the device needs to be transparent in that it is placed over some form of data display. If this is not the case, then a non-transparent sheet might be used for the plate or tablet e.g. steel, aluminum, brass, etc. For metal plates, the same problem in regards to bulk waves arises and can be solved in the same way as described above. For a metal sheet, a preferred absorbing sheet or layer would be a layer of epoxy resin containing a metal powder to provide an acoustic impedance match with the metal sheet.

FIG. 5 is a typical arrangement of a more complete set up using an encoder plate or sheet 10 with in this case transducer arrays 11*a*, 11*b* and 12*a*, 12*b* attached to the edges. The arrays which are energized sequentially to avoid mutual interference are connected via leads 15 to the electronic circuitry required to energize the apparatus and process the echo signals received. This circuitry consists chiefly of a radiator driver 16 an electronic switch 17, and an echo receiver 18. The electronic switch is a diode gate switch with four-pole, double throw action which permits the four arrays to be multiplexed into a single driver and receiver and isolates the receiver during the driver pulse. The echo receiver consists of an RF amplifier 19, a demodulator 20, and a threshold detector 21. The amplifier gain is electronically swept during each scan to compensate for the signal attenuation with range by gain sweep 22. The output of the receiver goes to timing logic circuit which accomplishes echo timing by means of an oscillator 24, a gate 23, and a binary counter 30. Both up and down counting are required to digitize scans originating at opposite sides of the input surface. The output of the counter passes to $x$-register 25 or $y$-register 26 as appropriate and thence to the computer. Control of the timing and other operations is maintained by signals from a control logic center 27. The control circuitry allows two modes of operation, a continuous mode and a discrete mode. In the continuous mode a DATA READY pulse via line 28 signals the computer for every set of coordinates generated while stylus contact is maintained. In the discrete mode, only the location of the initial contact is transferred to the computer. The stylus must be lifted and repositioned to initiate another data transfer. The discrete mode considerably reduces the amount of data that must be handled without degrading the response time when the apparatus is being used for item selection or position reporting.

It has been found that by using a laminated plate structure as described above that display and encoder areas much larger than 10 inches × 10 inches can be efficiently operated.

I claim:

1. A touch-sensitive position encoder for computer input comprising:

a. an extensive sheet having a surface suitable for the propagation of elastic surface waves, b. a first transducer positioned at a first position at an edge of said sheet, c. a second transducer positioned at a second position at an edge of said sheet, said transducers being such as to act as radiators and sensors of elastic surface waves on said sheet, d. a pulsed source of energy connected to said transducers for generating surface waves on the sheet, and e. receiver and timing means connected to the transducers for detecting and timing reflected energy pulses such that the position of a human finger or other passive stylus placed on the sheet and causing reflections will determined, f. said extensive sheet having a layered construction formed of a sheet of glass capable of propagating elastic surface waves and a sheet or layer of plastic material capable of absorbing bulk acoustic waves bonded or attached thereto.

2. A touch-sensitive position encoder for computer input comprising:

a. an extensive sheet having a surface suitable for the propagation of elastic surface waves, b. a first transducer positioned at a first position at an edge of said sheet, c. a second transducer positioned at a second position at an edge of said sheet, said transducers being such as to act as radiators and sensors of elastic surface waves on said sheet, d. a pulsed source of energy connected to said transducers for generating surface waves on the sheet, and e. receiver and timing means connected to the transducers for detecting and timing reflected energy pulses such that the position of a human finger or other passive stylus placed on the sheet and causing reflections will determined, f. said extensive sheet having a layered construction formed of two sheets of glass separated by a sheet or layer of material capable of absorbing bulk acoustic waves.

3. A tablet for a touch-sensitive position encoder of the type having an extensive sheet having a surface suitable for the propagation of elastic surface waves, transducers positioned at edges of the sheet and connected to pulsing, receiving and timing circuitry for generating and sensing surface waves on the sheet such that the position of a human finger or other passive stylus placed on the sheet and causing reflections will be determined comprising a layered sheet formed of a first sheet of material capable of propagating elastic surface waves, a second sheet or layer of material capable of absorbing bulk acoustic waves bonded or acoustically coupled thereto, and a third sheet of solid material bonded or affixed to the sheet or layer of material capable of absorbing bulk acoustic waves.

4. A tablet for a touch-sensitive position encoder as in claim 3 wherein the layered sheet has a sandwich construction formed of two sheets of glass with a layer or sheet of plastic material therebetween.

5. A tablet for a touch-sensitive position encoder of the type having an extensive sheet having a surface suitable for the propagation of elastic surface waves, transducers positioned at edges of the sheet and connected to pulsing, receiving and timing circuitry for generating and sensing surface waves on the sheet such that the position of a human finger or other passive stylus placed on the sheet and causing reflections will be determined comprising a layered sheet formed of a first sheet of glass capable of propagating elastic surfaces waves, and a second sheet or layer of plastic material capable of absorbing bulk acoustic waves bonded or acoustically coupled thereto.

* * * * *